(No Model.)
M. CLAUSNITZER.
PROCESS OF SETTING ROUGH DIAMONDS, &c., IN HOLDERS OR IMPLEMENTS OF METAL.
No. 486,084. Patented Nov. 15, 1892.
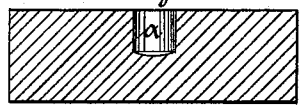
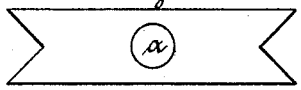
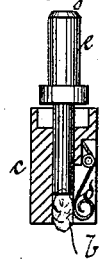
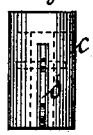
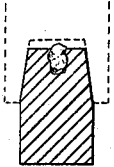
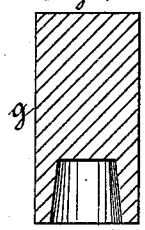
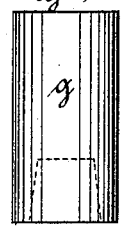
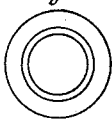
Witnesses:
E. B. Bolton
S. J. Jones.
Inventor:
Max Clausnitzer
By Richards
his Attorneys.

UNITED STATES PATENT OFFICE.

MAX CLAUSNITZER, OF BRESLAU, GERMANY.

PROCESS OF SETTING ROUGH DIAMONDS, &c., IN HOLDERS OR IMPLEMENTS OF METAL.

SPECIFICATION forming part of Letters Patent No. 486,084, dated November 15, 1892.

Application filed April 8, 1892. Serial No. 428,350. (No model.)

*To all whom it may concern:*

Be it known that I, MAX CLAUSNITZER, mechanician, a citizen of the Kingdom of Prussia, residing at Breslau, in the Province of Silesia, Empire of Germany, have invented a certain new and useful Process for Setting Rough Diamonds and other Precious Stones in Holders or Implements of Metal, of which the following is a specification.

My invention relates to a process or method of setting rough diamonds and other precious stones in holders or implements of gun-metal, steel, copper, nickel, and similar materials, so that they may allow a good application for stone-saws, coal-cutting machines, rock-drills, and the like. The implements or tools for the said purposes have to overcome great resistances. Therefore the setting or fastening of the diamonds in such implements or holders must be an extraordinarily-good one.

The object of my invention is to make the setting or fastening of diamonds reliable and strong. I attain this object by the following process, for the carrying into effect of which I use the means illustrated in the accompanying drawings, in which—

Figure 1 is a vertical section of a holder or implement in which the diamond is to be fixed. Fig. 2 is a top view of Fig. 1. Fig. 3 is a vertical section of a holder with a diamond mounted. Fig. 4 is a plan of Fig. 3. Fig. 5 is a vertical section of a handle mounted with a spring and a die for handling the diamond and pressing it in the implement. Fig. 6 is a top view of Fig. 5. Figs. 7 and 8 show a side elevation and a plan of the handle, respectively. Figs. 9, 10, 11, and 12 show a side elevation and a plan of the die and a pile-block, respectively. Fig. 13 is a vertical section of another form of a holder. Fig. 14 is a top view of Fig. 13. Figs. 15 to 17 show holders with diamonds ready for use. Fig. 18 is a vertical section, Fig. 19 a side elevation, and Fig. 20 a top view, of a matrix for forming the upper part of the metal holder and for compressing the material round about the diamond.

Similar letters refer to similar parts throughout the several views.

The holder or implement of metal into which I intend to set or fix a diamond $b$ is to be furnished by means of a borer or drill with a hole $a$. The diameter of this hole must be a little smaller than the diameter of the diamond piece to be set. For making it, however, possible to set the diamond $b$ in this hole $a$ I enlarge the latter by heating the holder to red heat.

To make the handling of the proportionally-small diamond more easy, I prefer to use a handle $c$, provided with a spring $d$ and a movable die $e$, sliding in a central perforation or opening of the said handle $c$. In the central opening of this handle $c$ I put the diamond $b$, which will be held by a spring $d$ or any other suitable device in the position shown in Fig. 5 while the die $e$ is resting on the diamond. Now I may bring the handle $c$ under a suitable pressing device and put the heated holder or metal block so below the handle that the diamond is exactly over the hole $a$. By moving down the pressing device the diamond $b$ will be pressed by means of the movable die $e$ in the hole $a$—viz., in the heated material surrounding the said hole—so that the diamond is almost embedded in the heated metal. Sometimes I use a pile-block $f$, Figs. 11 and 12, provided at the lower end with a light excavation or recess to drive the diamond into the hole $a$, especially in order to improve and to accomplish the setting or mounting of the diamond.

For forming the outer and upper part of the holder after the diamond is mounted and in order to compress the material round about the diamond I press the holder with its upper part containing the diamond into a conical-shaped matrix $g$, Figs. 18 to 20, or a suitable matrix upon the top end of the holder, as indicated by dotted lines, Fig. 15. By cooling the still-heated holder suddenly the material shrinks up and embraces the diamond as closely as possible.

Having fully described my invention, what I claim, and desire to secure by Letters Patent, is—

The hereinbefore-described process of setting diamonds, consisting in first forming a recess or cavity in the implement of less size than the diamond, heating the holder to expand the recess or cavity, forcing the diamond into the recess by pressure, and applying pressure to the walls of the implement to compress the walls of the cavity about the diamond, substantially as described.

Signed at Breslau, in the Province of Silesia, Kingdom of Prussia, Empire of Germany, this 18th day of March, 1892.

MAX CLAUSNITZER.

Witnesses:
 ROBERT LORIPE,
 ALBERT DRABENTOURG.